US009479488B2

(12) United States Patent
Tseng et al.

(10) Patent No.: US 9,479,488 B2
(45) Date of Patent: Oct. 25, 2016

(54) NETWORK ACCESS BASED ON SOCIAL-NETWORKING INFORMATION

(71) Applicants: Erick Tseng, San Francisco, CA (US); Mohit Talwar, Redmond, WA (US); Adrian Potra, Redmond, WA (US); Michael John McKenzie Toksvig, Palo Alto, CA (US); David Harry Garcia, Sunnyvale, CA (US)

(72) Inventors: Erick Tseng, San Francisco, CA (US); Mohit Talwar, Redmond, WA (US); Adrian Potra, Redmond, WA (US); Michael John McKenzie Toksvig, Palo Alto, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 144 days.

(21) Appl. No.: 13/659,688

(22) Filed: Oct. 24, 2012

(65) Prior Publication Data

US 2013/0198383 A1    Aug. 1, 2013

Related U.S. Application Data

(63) Continuation-in-part of application No. 13/359,404, filed on Jan. 26, 2012.

(51) Int. Cl.
*G06F 7/04* (2006.01)
*H04L 29/06* (2006.01)
(Continued)

(52) U.S. Cl.
CPC ............. *H04L 63/08* (2013.01); *H04L 63/102* (2013.01); *H04L 67/306* (2013.01); *H04W 12/06* (2013.01); *H04W 12/08* (2013.01)

(58) Field of Classification Search
CPC . H04L 63/0853; H04L 63/08; H04L 63/102; H04L 63/101; H04W 12/06; H04W 12/08
USPC .......................................................... 726/7
See application file for complete search history.

(56) References Cited

U.S. PATENT DOCUMENTS 8,185,558 B1 *  5/2012  Narayanan et al. .......... 707/798
8,887,035 B2 * 11/2014  McDonald ............ G06Q 10/00
                                                          715/201

(Continued)

FOREIGN PATENT DOCUMENTS

KR   10-2005-0035305     4/2005
KR   10-2010-0091590     8/2010

(Continued)

OTHER PUBLICATIONS

International Search Report and Written Opinion for International Application PCT/US2013/066270, Mar. 12, 2014.

(Continued)

*Primary Examiner* — Jerry Dennison
(74) *Attorney, Agent, or Firm* — Baker Botts L.L.P.

(57) ABSTRACT

In one embodiment, a method includes receiving a request at a wireless access point from a client system to access a network through the wireless access point. The wireless access point sends an identifier associated with the client system to a social-networking system, the social-networking system including user profiles arranged in one or more social graphs. The social graphs store relationships between the user profiles. The method further includes receiving at the wireless access point from the social-networking system an authorization determination. The authorization determination is based upon a first user profile of the plurality of user profiles. The first user profile includes the identifier associated with the client system. The method further includes providing the client system with access to the network through the wireless access point in accordance with the authorization determination.

19 Claims, 11 Drawing Sheets

(51) Int. Cl.
  *H04W 12/06* (2009.01)
  *H04W 12/08* (2009.01)
  *H04L 29/08* (2006.01)

(56) References Cited

U.S. PATENT DOCUMENTS

| | | | |
|---|---|---|---|
| 2008/0151847 A1 | 6/2008 | Abujbara | |
| 2009/0181653 A1 | 7/2009 | Alharayeri | |
| 2009/0187983 A1* | 7/2009 | Zerfos et al. | 726/10 |
| 2010/0107225 A1 | 4/2010 | Spencer | |
| 2011/0319148 A1* | 12/2011 | Kinnebrew et al. | 463/1 |
| 2012/0110640 A1* | 5/2012 | Donelson | H04L 63/102 726/3 |
| 2012/0173541 A1* | 7/2012 | Venkataramani | 707/747 |
| 2012/0192258 A1* | 7/2012 | Spencer | H04W 12/06 726/7 |
| 2013/0007864 A1* | 1/2013 | Puflea | 726/7 |
| 2013/0067081 A1* | 3/2013 | Liu | H04W 12/06 709/225 |
| 2013/0103765 A1* | 4/2013 | Papakipos et al. | 709/206 |
| 2013/0185426 A1* | 7/2013 | Chevillat | 709/225 |
| 2013/0198274 A1* | 8/2013 | Papakipos | H04L 51/32 709/204 |
| 2014/0165163 A1* | 6/2014 | Salkintzis | H04W 12/06 726/5 |
| 2015/0012640 A1* | 1/2015 | Toksvig et al. | 709/224 |
| 2015/0012970 A1* | 1/2015 | Toksvig et al. | 726/3 |
| 2015/0127939 A1* | 5/2015 | Mazandarany | H04L 9/32 713/168 |
| 2016/0044720 A1* | 2/2016 | Boucher | H04W 12/08 370/310 |

FOREIGN PATENT DOCUMENTS

| | | |
|---|---|---|
| KR | 2011-0063819 A | 6/2011 |
| KR | 10-1106251 | 1/2012 |
| WO | WO 2007/076150 A2 | 7/2007 |
| WO | WO 2011/006231 * | 1/2011 |
| WO | WO 2011/126321 A2 | 10/2011 |

OTHER PUBLICATIONS

European Search Report for EP Application No. 13 189 364.6-1853. Dec. 2, 2013.
Communication Pursuant to Article 94(3) EPC received from the European Patent Office for EP Application No. 13 189 364.6-1853. Apr. 20, 2016.
Yap, Kok-Kiong et al. "Separating Authentication, Access and Accounting: A Case Study with Open WiFi", retrieved from the internet; URL: https://www.opennetworking.org/images/stories/downloads/sdn-resources/technical-reports/openflow-tr-2011-1-openwifi.pdf.; retrieved on Jan. 30, 2013; Sep. 15, 2011, pp. 1-7. Sep. 15, 2011.
Leavitt, N. "Will IEEE 802.1X Finally Take Off in 2008?", IEEE Computer Society, vol. 41. No. 3, Mar. 1, 2008, pp. 12-15. Mar. 1, 2008.
Ahsan, Mahmud New JavaScript SDK & OAuth 2.0 based FBConnect Tutorial, retrieved from the internet; URL:http://web.archive.org/web/20120730085310/http://thinkdiff.net/facebook/new-javascript-sdk-oauth-2-0-based-fbconnect-tutorial/?; retrieved on Nov. 21, 2013; Jul. 30, 2012, 35 pages. Jul. 30, 2012.
Cramer, Henriette, et al. "Performing a Check-in: Emerging Practices, Norms and 'Conflicts' in Location-Sharing Using Foursquare", MobileHC1 2011; ACM, US, Aug. 30, 2011, 10 pages.
Korean Notice of Allowance received from the Korean Patent Office for Korean Patent Application No. 10-2014-7023354. May 30, 2016.

* cited by examiner

NETWORK ACCESS BASED ON SOCIAL-NETWORKING INFORMATION

RELATED APPLICATION

This application is a continuation-in-part of U.S. patent application Ser. No. 13/359,404, entitled "Social Hotspot," filed Jan. 26, 2012.

TECHNICAL FIELD

This disclosure generally relates to providing network access based on social-networking information.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments of this disclosure are directed to providing network access based on social-networking information. In a particular embodiment, a wireless access point may receive a request from a client system to access a network through the wireless access point. For example, a user may connect to the wireless access point using a smartphone, laptop, or tablet computer and attempt to access the Internet through Wi-Fi provided by the wireless access point. The wireless access point may send an identifier associated with the client system to a social-networking system. The social-networking system may include user profiles arranged in at least one social graph that stores relationships between the user profiles. The social-networking system may determine whether network access (e.g., Wi-Fi) should be provided to the client system based on the identifier associated with the client system and based upon a user profile of the social-networking system that includes the identifier. The social-networking system then sends the determination to the wireless access point. The social-networking system may provide network access to the client system in accordance with the determination by the social-networking system.

Such embodiments may allow an entity, such as a merchant, to provide free Wi-Fi access to customers that are willing to "check-in" with the merchant through the social-networking system. In particular embodiments, the customer may check in using a user name of a user profile or an identifier of the client system, such as a media access control (MAC) address. During the check-in process, the merchant may direct marketing information to the customer via the customer's device. In some embodiments, this information may be customized based on information about the customer obtained from the social-networking system.

Other embodiments may allow an owner of a wireless access point to designate which social-networking system users should receive automatic Wi-Fi access. For example, the owner may associate the owner's user profile with a wireless access point. The owner may then designate that certain users of the social-networking system may access Wi-Fi from the wireless access point without entering a password. For example, the owner may designate that users linked to the owner as "friends" in the social-networking system may automatically receive Wi-Fi access from the wireless access point when a device of the user is within range of the wireless access point.

Certain embodiments of the present disclosure may provide one or more technical advantages. A technical advantage of one embodiment includes easy administration of Wi-Fi access. Another technical advantage of one embodiment includes automatic check-in for all devices of a user that are associated with the user's profile. Another technical advantage of one embodiment includes providing customized marketing information to a customer based on social-networking system information. Another technical advantage of one embodiment includes more efficient network access by allowing connections of the owner of a wireless access point to automatically connect to the access point.

DESCRIPTION OF EXAMPLE EMBODIMENTS

Figure 1:
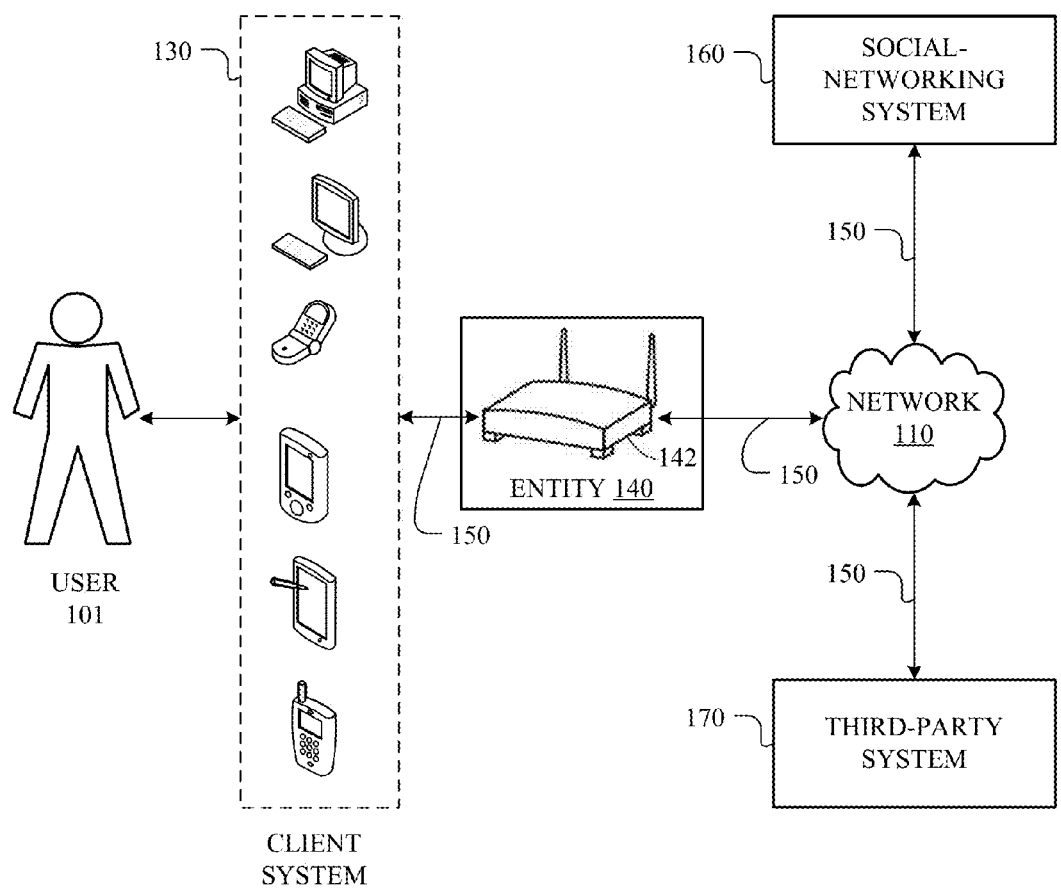
FIG. 1 illustrates an example network environment associated with a social-networking system and a wireless access point.

FIG. 1 illustrates an example network environment 100 associated with a social-networking system 160 and a wireless access point 142. Network environment 100 includes a user 101, a client system 130, a wireless access point 142 of an entity 140, a social-networking system 160, and a third-party system 170 connected to each other by a network 110. Although FIG. 1 illustrates a particular arrangement of user 101, client system 130, wireless access point 142, social-networking system 160, third-party system 170, and network 110, this disclosure contemplates any suitable arrangement of user 101, client system 130, wireless access point 142, social-networking system 160, third-party system 170, and network 110. As an example and not by way of limitation, two or more of client system 130, wireless access point 142, social-networking system 160, and third-party system 170 may be connected to each other directly, bypassing network 110. As another example, two or more of client system 130, wireless access point 142, social-networking system 160, and third-party system 170 may be physically or logically co-located with each other in whole or in part. Moreover, although FIG. 1 illustrates a particular number of users 101, client systems 130, entities 140, wireless access points 142, social-networking systems 160, third-party systems 170, and networks 110, this disclosure contemplates any suitable number of users 101, client systems 130, entities 140, wireless access points 142, social-networking systems 160, third-party systems 170, and networks 110. As an example and not by way of limitation, network environment 100 may include multiple users 101, client systems 130, entities 140, wireless access points 142, social-networking systems 160, third-party systems 170, or networks 110.

In particular embodiments, user 101 may be an individual (human user), an entity (e.g., an enterprise, business, or third-party application), or a group (e.g., of individuals or entities) that interacts or communicates with or over other elements of network environment 100 such as devices coupled to network 110 or social-networking system 160. In particular embodiments, one or more users 101 may use one or more client systems 130 to access, send data to, and receive data from network 110, social-networking system 160, or third-party system 170. Client system 130 may access network 110, social-networking system 160, or third-party system 170 directly or via a third-party system or device. As an example and not by way of limitation, client system 130 may access third-party system 170 via social-networking system 160. In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130.

In particular embodiments, client system 130 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser to a particular server (such as a server coupled to network 110, or a server associated with social-networking system 160 or third-party system 170), and the web browser may generate a Hyper Text Transfer Protocol (HTTP) request and communicate the HTTP request to the server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

Entity 140 may represent any individual, business, or organization. Entity 140 may be associated with wireless access point 142. For example, entity 140 may own or control wireless access point 142. In particular embodiments, entity 140 is a merchant that offers free network access (e.g., to the Internet) to authorized customers via wireless access point 142. In other embodiments, entity 140 is an owner of a wireless access point 142 located at the residence or business of the owner. In particular embodiments, wireless access point 142 is operable to bridge or route data traffic between client system 130 and network 110. Wireless access point 142 may include a router, gateway, modem, a network switch, or other suitable device for providing network access to client systems 130. In particular embodiments, wireless access point 142 is capable of communicating with a plurality of client systems 130 via wired or wireless links 150. Wireless access point 142 is also capable of communicating with network 110 via link 150.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, wireless access point 142, social-networking system 160, and third-party system 170 to communication network 110 or to each other. This disclosure contemplates any suitable links 150. In particular embodiments, one or more links 150 include one or more wireline (such as for example Ethernet, Digital Subscriber Line (DSL), or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, the wireless access point 142 may communicate with social-networking system 160 to determine whether a user is authorized to use wireless access point 142. The social-networking system 160 may decide whether to allow a particular user based at least upon social-networking information associated with the user and may communicate this decision to wireless access point 142.

In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110.

Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include one or more user-profile stores for storing user profiles. A user profile may include, for example, a user name and password, identifiers of client systems used by the user, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet. Third-party system 170 may be accessed by the other components of network environment 100 either directly or via network 110.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

Figure 2:
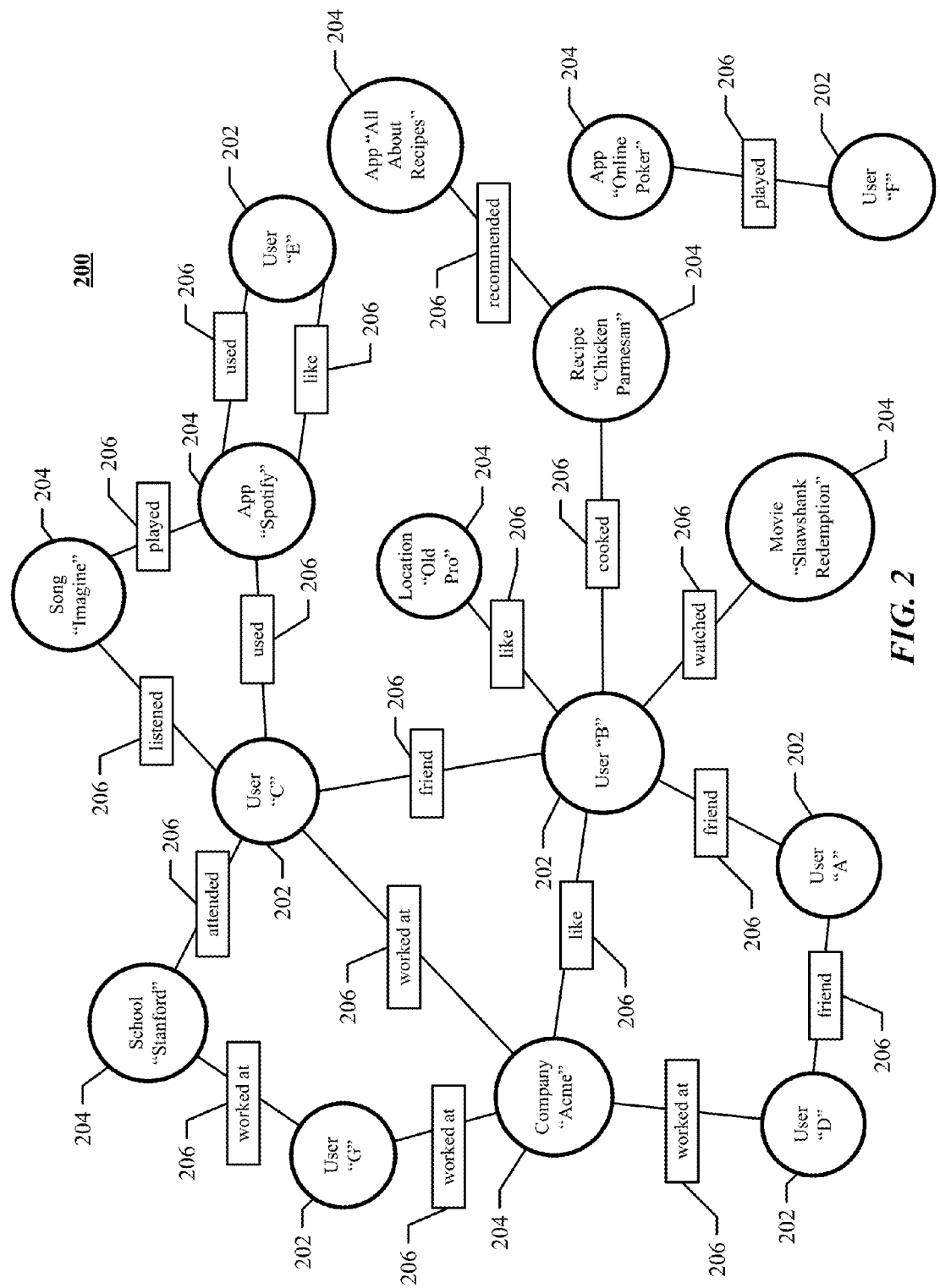
FIG. 2 illustrates an example social graph.

FIG. 2 illustrates an example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge)

between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, a user profile stored by social-networking system 160 may include at least one user node 202 and an indication of the various concept nodes 204, edges 206, and other user nodes 202 associated with the particular user node 202.

Figure 3A:
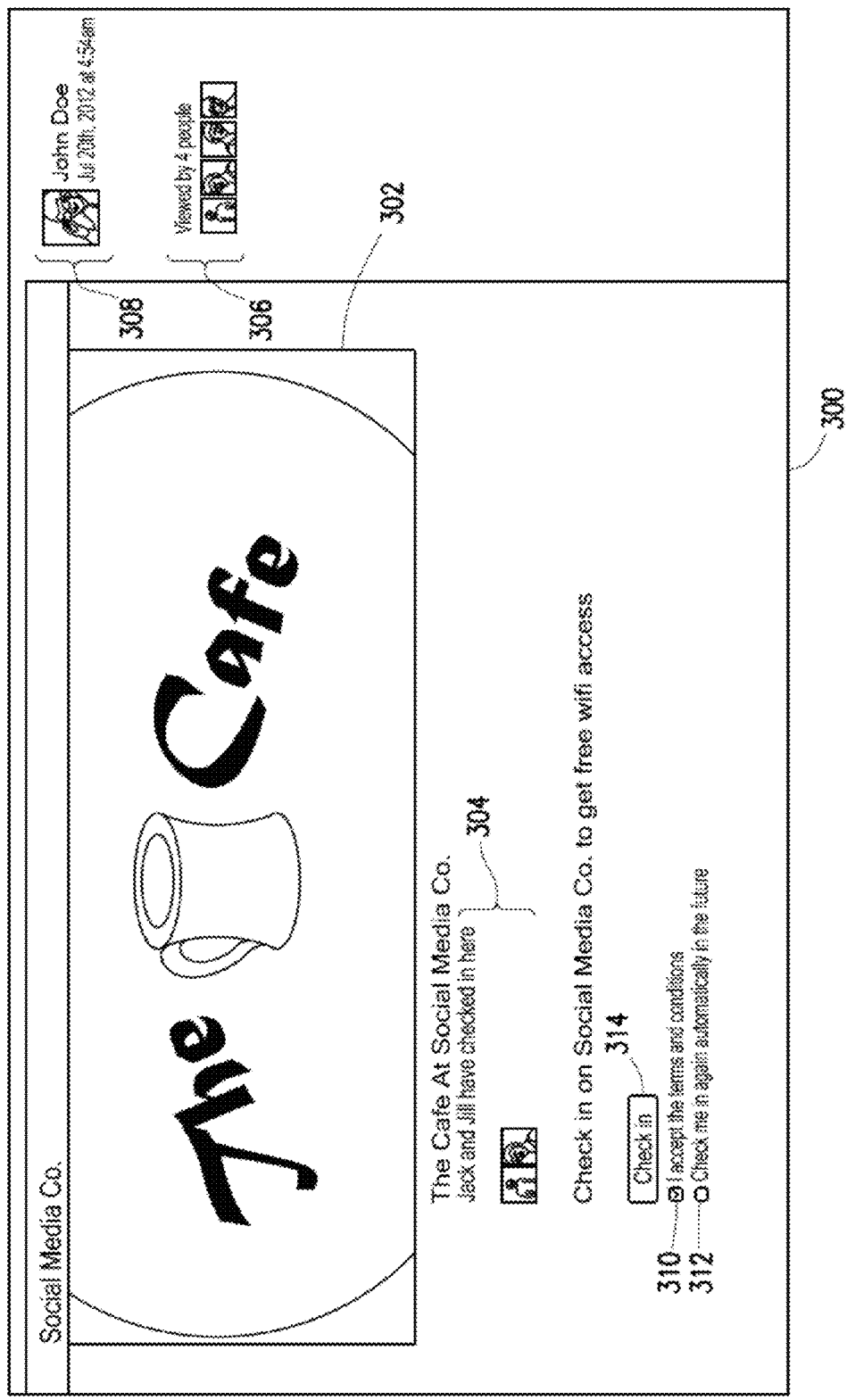
FIG. 3A illustrates an example network access page associated with the wireless access point of FIG. 1.

FIG. 3A illustrates an example network access page 300 associated with the wireless access point 142 of FIG. 1. The network access page 300 may be sent to client system 130 by wireless access point 142 and displayed by client system 130. Client system 130 may utilize a web browser or other dedicated application to display network access page 300. Network access page 300 may be sent to client system 130 and displayed by client system 130 in response to an attempt by client system 130 to access the Internet or other network through wireless access point 142.

Network access page 300 may include any suitable information associated with entity 140. In particular embodiments, network access page 300 includes information from a profile page of entity 140 stored by social-networking system 160. For example, in the embodiment depicted, network access page 300 includes profile photo 302 and the name of entity 140 ("The Cafe"). In particular embodiments, network access page 300 may also include information obtained from one or more social graphs 200 stored by social-networking system 160. For example, in the embodiment depicted, network access page 300 includes an indication of friends 304 or other connections of the user of client system 130 that have checked in with entity 140 via the network access page 300. In particular embodiments, network access page 300 may include an indication of friends that are currently checked-in with entity 140 or that have checked in recently. As another example, network access page 300 may also include an indication 306 of users of social-networking system 160 that have viewed the network access page 300 or a profile page associated with entity 140 stored by social-networking system 160. As yet another example, network access page 300 may include an indication of friends or other users of social-networking system 160 that have recommended (e.g., "liked") entity 140. In particular embodiments, network access page 300 may also display information associated with the user of client system 130. For example, in the embodiment depicted, network access page 300 includes a profile photo and name 308 of the user. This may allow a user to verify that the correct user is being checked in (e.g., the client system 130 may be used by multiple users).

Network access page 300 may include an instruction that indicates that network access will be provided upon check-in by the user. Network access page 300 may also indicate that the check-in is to be accomplished via a social media company (e.g., FACEBOOK or GOOGLE) that controls social-networking system 160. Accordingly, if the same social media company hosts similar check-in services for multiple entities and their respective wireless access points 142, a familiar interface may be offered to the user for check-ins. Network access page 300 may include a terms and conditions check box 310 for accepting the terms and conditions for network access through wireless access point 142 (along with an indication of or a link to the terms and conditions).

The information displayed in network access page 300 may be obtained in any suitable manner. In particular embodiments, the information may be stored by social-networking system 160 and sent to client system 130 via wireless access point 142 in response to a request for network access by client system 130. In particular embodiments, wireless access point 142 may store all or a portion of the network access page 300 prior to the request by client system 130. In such embodiments, portions of the network access page 300 that are dependent upon social graph information associated with the user may be obtained from social-networking system 160 in response to the request for network access by client system 130. This information may then be merged with the portion of network access page 300 that is stored by wireless access point 142 before the network access page 300 is sent to client system 130.

Network access page 300 may also include a check-in button 314 that effects submission of a check-in request when selected. In particular embodiments, selection of check-in button 314 may result in the sending of an identifier associated with the client system 130 to social-networking system 160. Any suitable identifier associated with client system 130 may be sent, such as a user name of a user profile stored by social-networking system 160 (e.g., the user name of the user of client system 142), a password associated with the user profile, a MAC address of client system 130, an International Mobile Equipment Identity (IMEI) of client system 130, or other suitable identifier. In particular embodiments, network access page 300 may include a prompt for a user to enter the identifier. In other embodiments, the client system 130 may retrieve the identifier in response to the selection of check-in button 314 (e.g., the identifier may be stored in memory of client system 130) and send the identifier to wireless access point 142. Upon receiving the identifier, wireless access point 142 forwards the identifier to social-networking system 160 for an authorization determination.

Social-networking system 160 utilizes the identifier to determine whether the client device 130 should be allowed network access through wireless access point 142 and sends its decision to wireless access point 142. Social-networking system 160 may check the identifier against user profile information to determine whether the client system 130 should be checked in. For example, in particular embodiments, if social-networking system 160 cannot identify a user profile based on the identifier, authorization may be denied, while if a user profile can be identified, authorization is granted. In particular embodiments, the user profile of entity 140 may also be checked to determine whether the user requesting network access is authorized. For example, entity 140 may grant access to anyone with a user profile or only to certain individuals or groups of users such as users having a connection (e.g., friends of or those who have "liked" the entity). As another example, entity 140 may specify that particular users should not be granted network access. If the authorization determination is positive, the client system 130 is checked in. If the determination is negative, the user may be presented with a message indicating that check-in was unsuccessful and given another change to check in. Upon check-in, the client device 130 may be redirected to a page associated with entity 140 and given network access.

Network access page 300 may also include an automatic check-in option 312. When a user has selected the automatic check-in option 312, the client system 130 may be automatically checked in with entity 140 during future visits to the entity. For example, client system 130 may be automatically checked in when the client system 130 enters the range of wireless access point 142 or attempts to access network 110 via wireless access point 142. In particular embodiments, the automatic check-ins may be performed in a manner that does not involve user interaction. In other embodiments, automatic check-in may include a push notification sent to client system 130 through a dedicated social media application asking whether the user desires to check in.

In particular embodiments, selection of the automatic check-in option may result in the automatic checking in of any client system 130 associated with the user profile of the user. Accordingly, in particular embodiments, a user need only check in manually (e.g., via network access page 300) using one client system 130 in order to obtain network access for any of the user's client systems 130. For example, a user may check in with a smartphone and subsequently check-in automatically with a laptop. In such embodiments, an identifier of each client system 130 associated with the user may be included in the user profile of the user stored by social-networking system 160 and used to determine whether the client system 130 should be checked in automatically. The identifiers may be obtained and associated with the user profile in any suitable manner. For example, the user may log in to the social-networking system 160 and explicitly enter an identifier and associate it with the user profile. As another example, the identifier may be detected by the social-networking system 160 when the user logs into social-networking system 160 through the particular client system 130. Any suitable identifier may be used, such as a MAC address of the client system 130. In particular embodiments, wireless access point 142 stores identifiers associated with the client systems 130 that have checked in so that wireless access point 142 does not need to contact social-networking system during subsequent check-ins by those client systems.

In particular embodiments, a cookie stored by a browser of client system 130 may facilitate automatic check-in of a user. As an example, when a user requests network access page 300, social-networking system 160 or wireless access point 142 may generate a cookie and send the cookie to client system 130. The cookie may be associated with the URL or other identifier of network access page 300 and stored by the browser. Client system 130 may submit the cookie in future check-in requests (e.g., the cookie may be sent with a request for network access page 300). When wireless access point 142 or social-networking system 160 receives a request for check-in that includes a valid cookie, the client system 130 may be checked in and redirected to a page associated with entity 140. Thus, the display of network access page 300 may be skipped if a valid cookie is received. In particular embodiments, the cookie may be verified and network access provided to client system 130 by the wireless access point without communicating with social-networking system.

In particular embodiments, network access page 300 may include an option to acquire network access in a manner that does not require a check-in involving the provision of information associated with a user profile stored by social-networking system 160. For example, network access may be provided in response to the user completing a task. For example, network access may be provided in response to the user claiming an offer from entity 140, uploading a photo to a particular website, liking a webpage or user profile associated with entity 140, or other suitable action. Instructions describing one or more tasks that may be taken to gain network access may be displayed by network access page 300. In particular embodiments, wireless access point 142 may store a record that associates an indication of the completion of the task with the identifier of client system 130 such that the user may be provided network access in the future without having to complete the same task. In other embodiments, network access page 300 may include a prompt for a password (e.g., a merchant provided code). The password may be obtained in any suitable manner. For example, the password may be provided to user 101 by entity 140 or other source. In particular embodiments, the password is provided in response to user 101 completing a task. For example, the password may be provided in response to the user claiming an offer, uploading a photo to a particular website, liking a webpage or user profile associated with entity 140, or other suitable action. Upon submission of a valid password (e.g., a merchant provided code) through network access page 300, network access is provided to client system 130. In particular embodiments, wireless access point 142 may verify the veracity of the password without communicating with social-networking system 160.

Figure 3B:
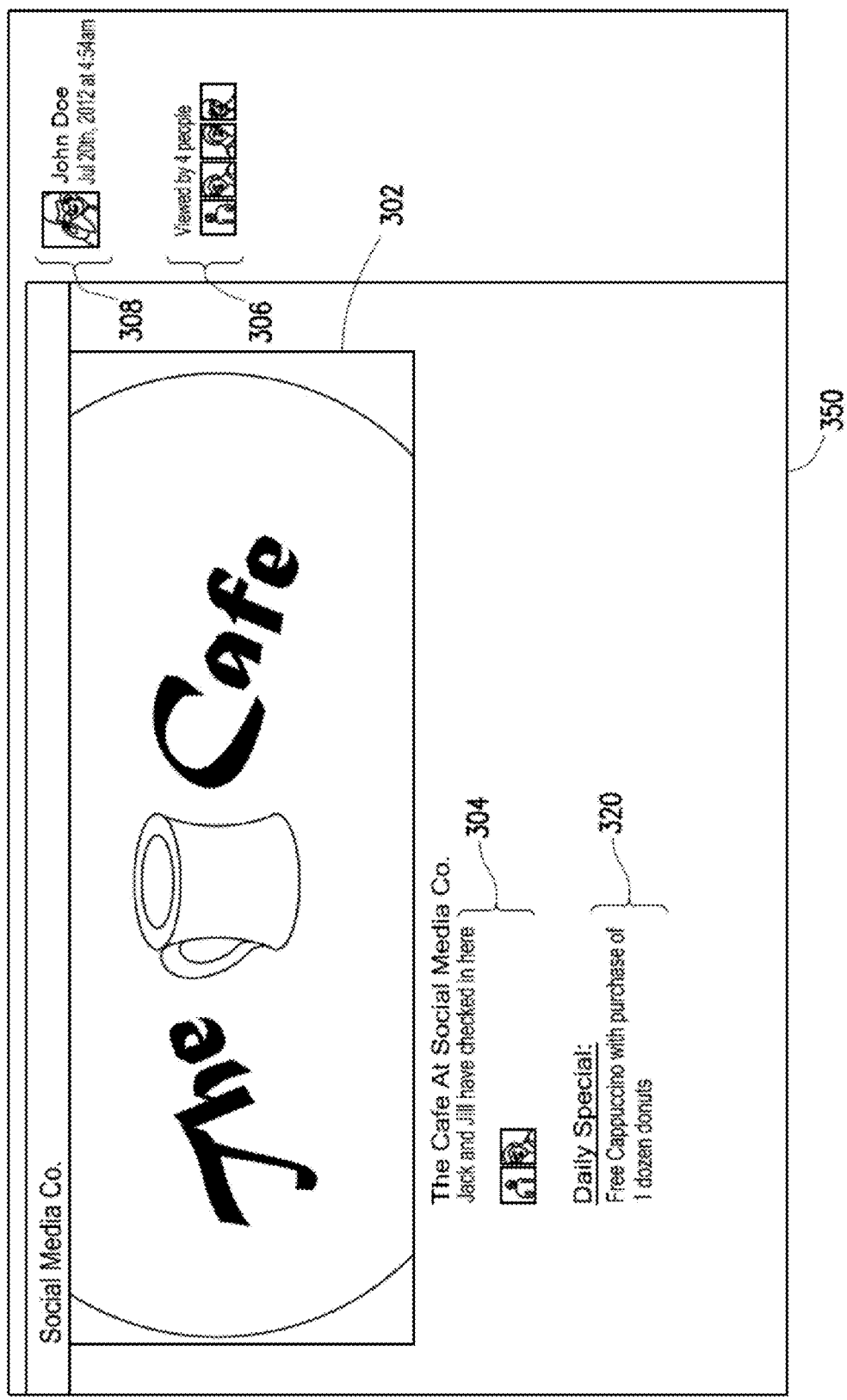
FIG. 3B illustrates an example entity page associated with the wireless access point of FIG. 1.

FIG. 3B illustrates an example entity page 350 associated with the wireless access point 142 of FIG. 1. Upon checking in with entity 140, client system 130 may be redirected to entity page 350 before the client system is provided with network access. Entity page 350 includes information about entity 140. Entity page 350 may be the entity's profile page hosted by social-networking system 160, may include information from the entity's profile page, may be the entity's website, or may include other suitable information about the entity. In the embodiment depicted, entity page 350 includes some of the same features found in network access page 300, such as profile photo 302, the name of entity 140, an indication of friends 304 that have checked in with entity 140, an indication 306 of users of social-networking system 160 that have viewed the network access page 300, and a profile photo and name 308 of the user. Although particular information is depicted in entity page 350, various embodiments may include any suitable information.

In particular embodiments, entity page 350 includes marketing information associated with entity 140, such as advertisements, offers, coupons, or other information associated with one or more products or services provided by entity 140. For example, in the embodiment depicted, an offer 320 for a free cappuccino with the purchase of donuts is displayed. In particular embodiments, the marketing information is customized based on information obtained from one or more social graphs 200 stored by social-networking system 160. For example, the marketing information may be based on one or more items that the user or a connection of the user has indicated a preference for (e.g., by "liking" the item) as indicated in the relevant user profiles. As another example, the marketing information may be based on one or more items previously purchased by the user. In particular embodiments, entity 140 or social-networking system 160 may track purchases of users that have checked in with entity 140 and use this information to customize the marketing information displayed by entity page 350. After entity page 350 is displayed by client system 130, client system 130 may access resources coupled to network 110 via wireless access point 142. For example, a user may access the Internet using Wi-Fi provided by wireless access point 142.

In particular embodiments, check-in may involve the addition of information associated with entity 140 to one or more social graphs 200 stored by social-networking system 160. For example, a user profile of entity 140 may be modified to reflect the check-in by the user. Such information may be displayed by network access pages 350 shown to other users. As another example, a user profile of the user that checked in may be modified. For example, a timeline of a profile page of the user may be updated with a message that indicates that the user checked in to entity 140, the location of entity 140, the time of the check-in, or other suitable information associated with the check-in. The modification of user profile information may be subject to the privacy settings associated with the user's profile.

In particular embodiments, client system 130 is operable to execute an application that searches for wireless access points 142 that check in users via social-networking system 160 in the manner described above. In particular embodiments, the application may be a web browser or a dedicated social media application that communicates with social-networking system 160 to identify wireless access points 142. The application may be operable to identify wireless access points 142 based on the current location of the user. For example, the application may identify wireless access points 142 within a predefined radius of the user. The application may also be operable to query one or more social graphs 200 of social-networking system 160 to determine wireless access points 142 that have been used, are being used, have been recommended by, or are otherwise associated with friends or other connections of the user of the client system 130. The application may also be operable to recommend wireless access points 142 that are based on the user's preferences (e.g., "likes") as stored in the relevant user profile on social-networking system 160. In particular embodiments, the ranking of search results for wireless access points 142 may be based upon a bid amount paid by the entity 140 that operates a wireless access point 142.

Figure 4:
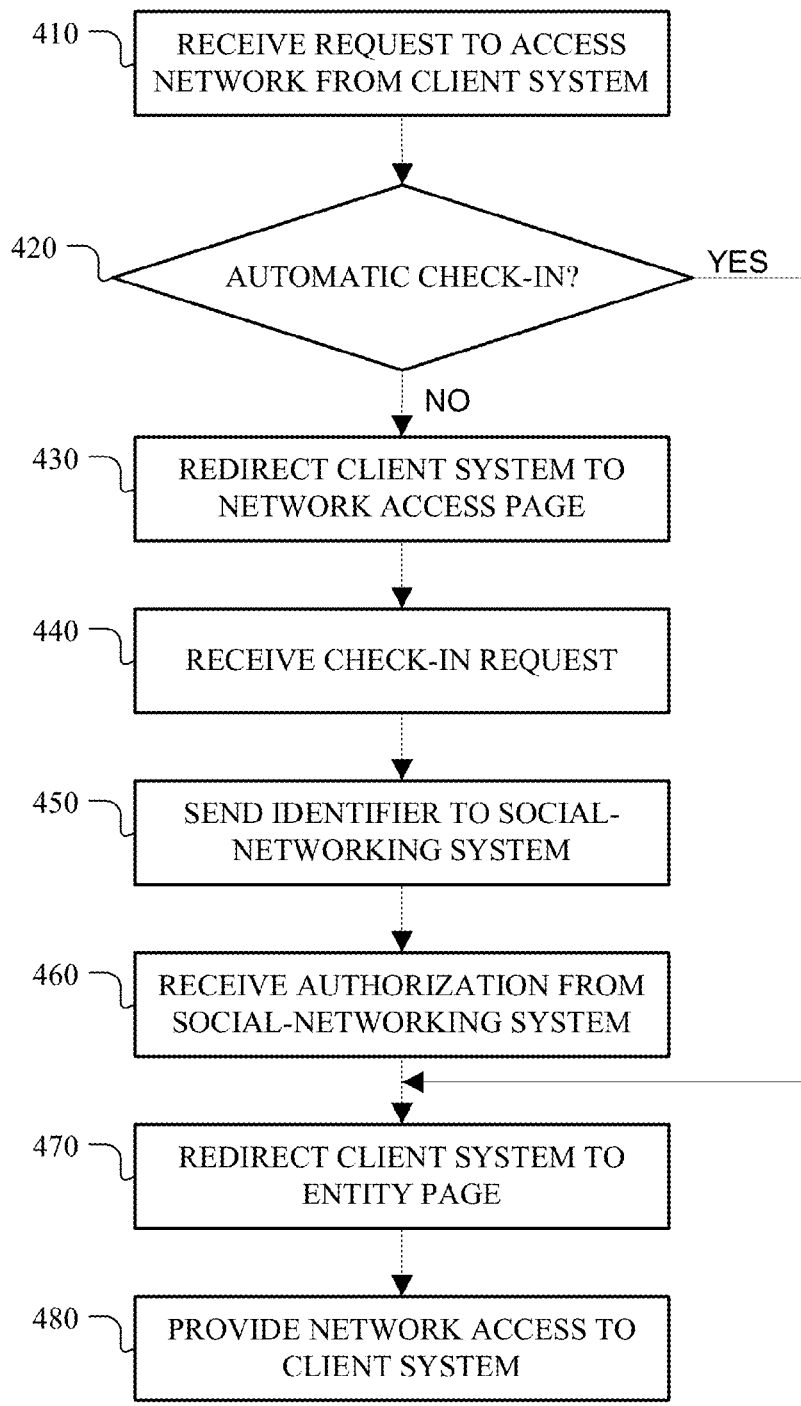
FIG. 4 illustrates an example method for providing network access based on social-networking information.

FIG. 4 illustrates an example method 400 for providing network access based on social-networking information. Method 400 may be performed by wireless access point 142. The method may begin at step 410, where a request to access a network is received from a client system. For example, wireless access point 142 may receive a request to access a resource on the Internet (e.g., a webpage) from a web browser or dedicated application executed by client system 130. At step 420, it is determined whether the client system 130 may be automatically checked in. This may be determined in any suitable manner. For example, a user profile stored by social-networking system 142 that is associated with the user of client system 130 may be checked to determine whether the user has specified that client system 130 may be automatically checked in. As another example, an identifier of client system 130 may be checked against a list of identifiers stored by wireless access point 142 that are known to be authorized for automatic check-in. If the client system 130 may be automatically checked in, the method may skip to step 470. If not, the method moves to step 430 where the client system is redirected to a network access page, such as network access page 300. At this step, a browser or dedicated application running on client system 130 may display network access page 300.

At step 440, the user submits a check-in request and the check-in request is received by wireless access point 142. The check-in request may be submitted via network access page 300. The check-in request may include an identifier associated with the client system 130. At step 450, the identifier is sent to social-networking system 160 by wireless access point 142. Social-networking system 160 may check the identifier against social-networking information to determine whether client system 130 may be checked in and allowed network access. For example, social-networking system 160 may authorize check-in if a user name and/or password submitted with the check-in request matches a user name and/or password stored in a user profile stored by social-networking system 160. As another example, social-networking system 160 may authorize check-in if a MAC address of client system 130 is associated with a user profile stored by social-networking system 160. In particular embodiments, a user profile of entity 140 may also be checked to verify that the user of client system 130 is authorized to check in.

At step 460, wireless access point 142 receives authorization from social-networking system 160 to check in client system 130. At step 470, client system 130 is redirected to an entity page, such as entity page 350. The entity page is displayed by a browser or dedicated application of client system 130. After the entity page is sent to client system 130, the client system is allowed to access network 110 via wireless access point 142 at step 480.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
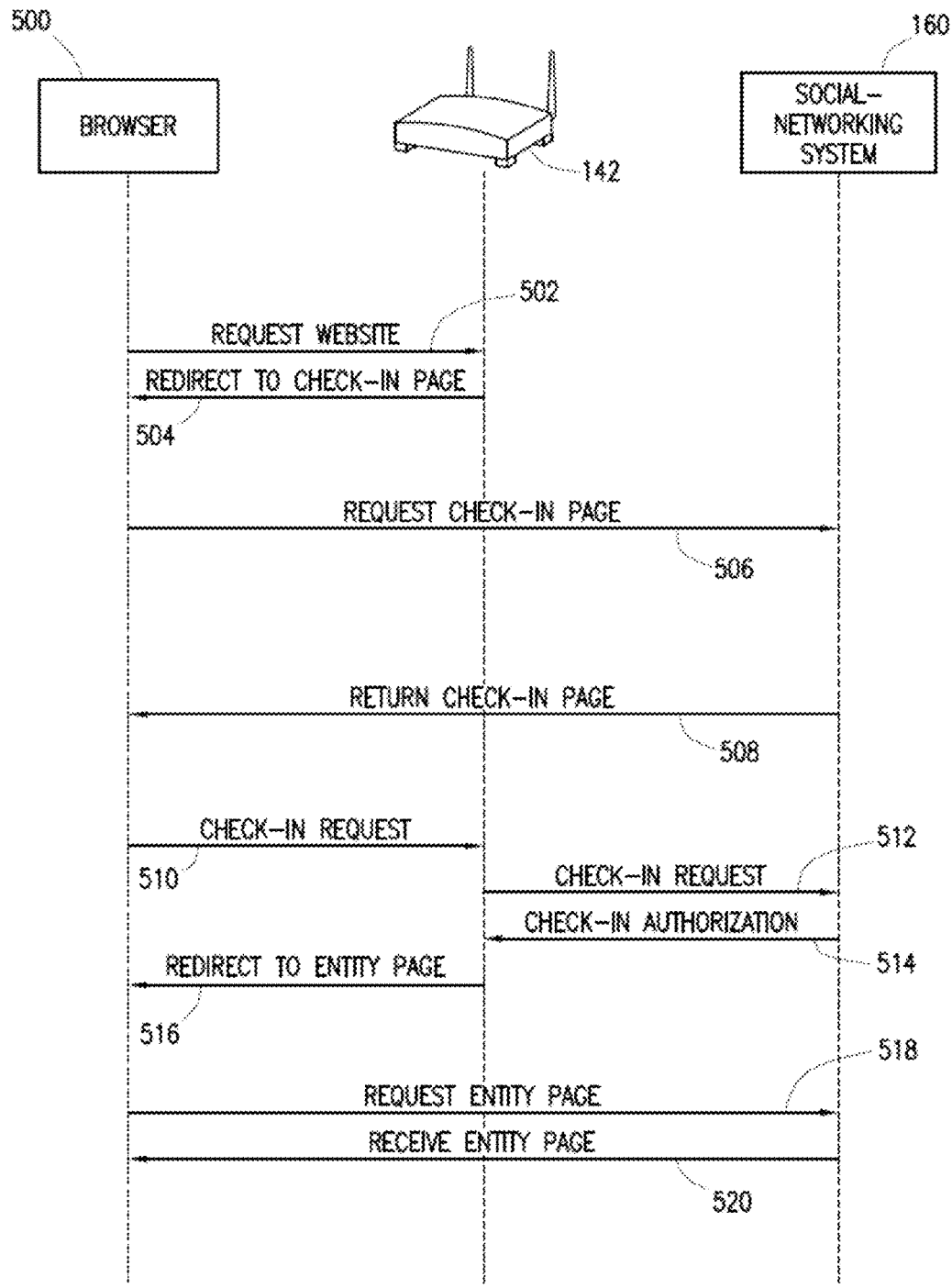
FIG. 5 illustrates an example communication flow for providing network access based on social-networking information.

FIG. 5 illustrates an example communication flow for providing network access based on social-networking information. Browser 500 represents a web browser (or other application) that may be executed by client system 130. Communication flow depicts a series of communications that may be sent between browser 500, wireless access point 142, and social-networking system 160.

In communication 502, browser 500 sends a request for a website to wireless access point 142. In particular embodiments, the request includes an uniform resource locator (URL) or an Internet Protocol (IP) address of the website. In some embodiments, the request is an HTTP request or other request made via a Transmission Control Protocol (TCP) port. Upon receiving the request, wireless access point 142 determines that client system 130 running browser 500 is not checked in and sends a redirect to a network access page 300 (depicted in FIG. 5 as a check-in page) to browser 500 in communication 504. The redirect may include the URL of network access page 300. In particular embodiments, the redirect is an HTTP response message with status code 302.

In communication 506, browser 500 requests the network access page 300 (e.g., check-in page) from social-networking system 160 via wireless access point 142. The network access page request may include a URL or other identifier associated with network access page 300. In particular embodiments, an identity of the user of client system 130 may also be sent with the network access page request to social-networking system 160. Social-networking system 160 may use the identity to obtain relevant information from one or more social graphs 200 stored by social-networking system 160. Social-networking system 160 may then use this information and any other suitable information (such as information obtained from a profile page of entity 140) to generate a representation of network access page 300 (e.g., HyperText Markup Language (HTML) code describing network access page 300). In other embodiments, wireless access point 142 or a computer system coupled to wireless access point 142 may generate all or a portion of network access page 300.

In communication 508, the representation of the network access page 300 (e.g., check-in page) is sent from social-networking system 160 to browser 500. The network access page 300 is then rendered and displayed by browser 500. The network access page 300 may include an option for a user to check in with entity 140. In response to the user selecting the check-in option, a check-in request is generated by browser 500 and sent to wireless access point 142 in communication 510. Wireless access point 142 forwards the check-in request to social-networking system 160 in communication 512. In particular embodiments, communication 512 also includes an identifier associated with client system 130 or the identifier may be sent separately.

Upon receipt of the check-in request and identifier associated with client system 130, social-networking system 160 determines whether the client system 130 may be checked in. Upon a determination that check-in is authorized, a check-in authorization is sent to wireless access point 142 in communication 514. Wireless access point 142 then sends a redirect to an entity page 350 to browser 500 in communication 516. The redirect may include the URL or other identifier of entity page 350. In particular embodiments, the redirect is an HTTP response message with status code 302.

In communication 518, browser 500 requests entity page 350 from social-networking system 160 via wireless access point 142. The entity page request may include a URL or other identifier associated with entity page 350. In particular embodiments, an identity of the user of client device 130 may also be sent with the entity page request to social-networking system 160. Social-networking system 160 may use the identity to obtain relevant information from one or more social graphs 200 stored by social-networking system 160. Social-networking system 160 may use this information and any other suitable information (such as information obtained from a profile page of entity 140) to generate a representation of entity page 350 (e.g., HTML code describing entity page 350) that is tailored to the user of client system 130. In communication 520, the representation of the entity page 350 is sent from social-networking system 160 to browser 500. In other embodiments, wireless access point 142 or a computer system coupled to wireless access point 142 may generate all or a portion of entity page 350 and send the representation of entity page 350 to browser 500. The entity page 350 is then rendered and displayed by browser 500.

Although this disclosure describes and illustrates particular communications of FIG. 5 as occurring in a particular order, this disclosure contemplates any suitable order for the communications of FIG. 5. Furthermore this disclosure contemplates more or fewer communications as well as different types of communications. For example, the network access page 300 and entity page 350 may be displayed by a dedicated social media application of client system 130 rather than as a webpage in browser 500.

Figure 6:
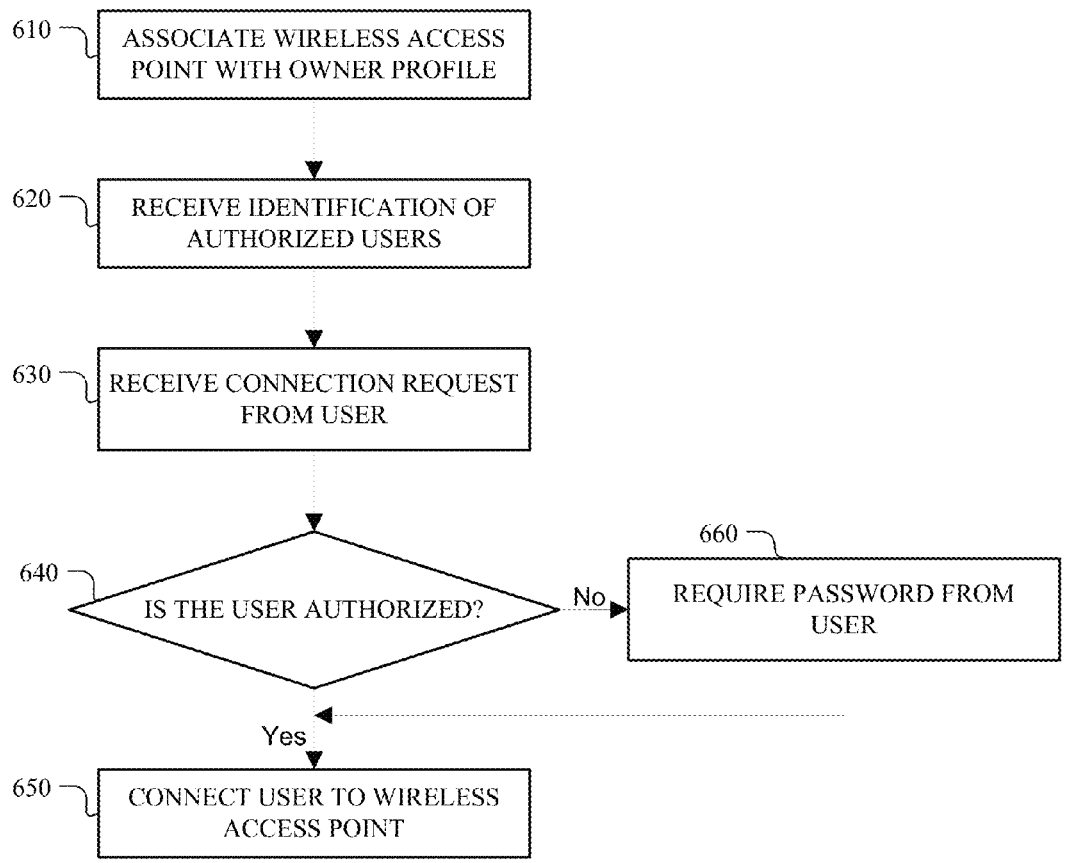
FIG. 6 illustrates another example method for providing network access based on social-networking information.

FIG. 6 illustrates another example method 600 for providing network access based on social-networking information. The method may be performed by any suitable wireless access point, such as wireless access point 142. In particular embodiments, the wireless access point is located in the home or business of the owner of the wireless access point. The method may begin at step 610, where wireless access point 142 is associated with a user profile stored by social-networking system 160. In particular embodiments, the user profile may be the profile of the owner of the wireless access point or the profile of another individual that controls the wireless access point. The wireless access point 142 may be associated with the user profile in any suitable manner. For example, wireless access point 142 may be operable to receive an identification of the user profile through a user interface displayed on a computer system coupled to the wireless access point and store the identification of the user profile.

At step 620, an identification of users authorized to receive automatic network access through the wireless access point 142 is received. In particular embodiments, the owner of wireless access point 142 may identify individuals or groups of users that may receive automatic access. These identifications may be stored in the user profile of the owner by social-networking system 160. The users authorized to receive automatic access may be identified in any suitable manner. For example, user names of user profiles stored by social-networking system 160 may identify these users. As another example, device identifiers (such as MAC addresses) of client systems 130 associated with authorized users may be used to identify these users. As yet another example, the owner may specify that a certain group of the owner's connections (e.g., as identified in a social graph 200) be granted automatic access. For example, the friends of the owner or the friends of friends of the owner may be granted automatic access.

At step 630, a connection request is received by the wireless access point from a user. The connection request may request a communication channel between the user's client device 130 and wireless access point 142. In particular embodiments, the connection request includes an identifier associated with the client system 130 of the user. At step 640, it is determined whether the user is authorized for automatic access to the wireless access point. This may be determined in any suitable manner. For example, in response to receiving a connection request from client system 130, wireless access point 142 may send the identifier associated with client system 130 to social-networking system 160 and the social-networking system may determine whether the user has been authorized by the owner. As another example, wireless access point may communicate with social-networking system 160 before receiving the connection request and may receive a group of identifiers associated with client systems 130 (e.g., user names or MAC addresses of the client systems) that may be used to determine whether a particular user is authorized for automatic access.

If the user is authorized, wireless access point 142 establishes a connection with client system 130 at step 650. If the user is not authorized, the wireless access point 142 may perform a default procedure for establishing a connection. For example, the user may be required to provide a password associated with wireless access point 142 at step 660 before being allowed to connect to the wireless access point. Upon connection, the user may access one or more networks (e.g., the Internet) via wireless access point 142.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
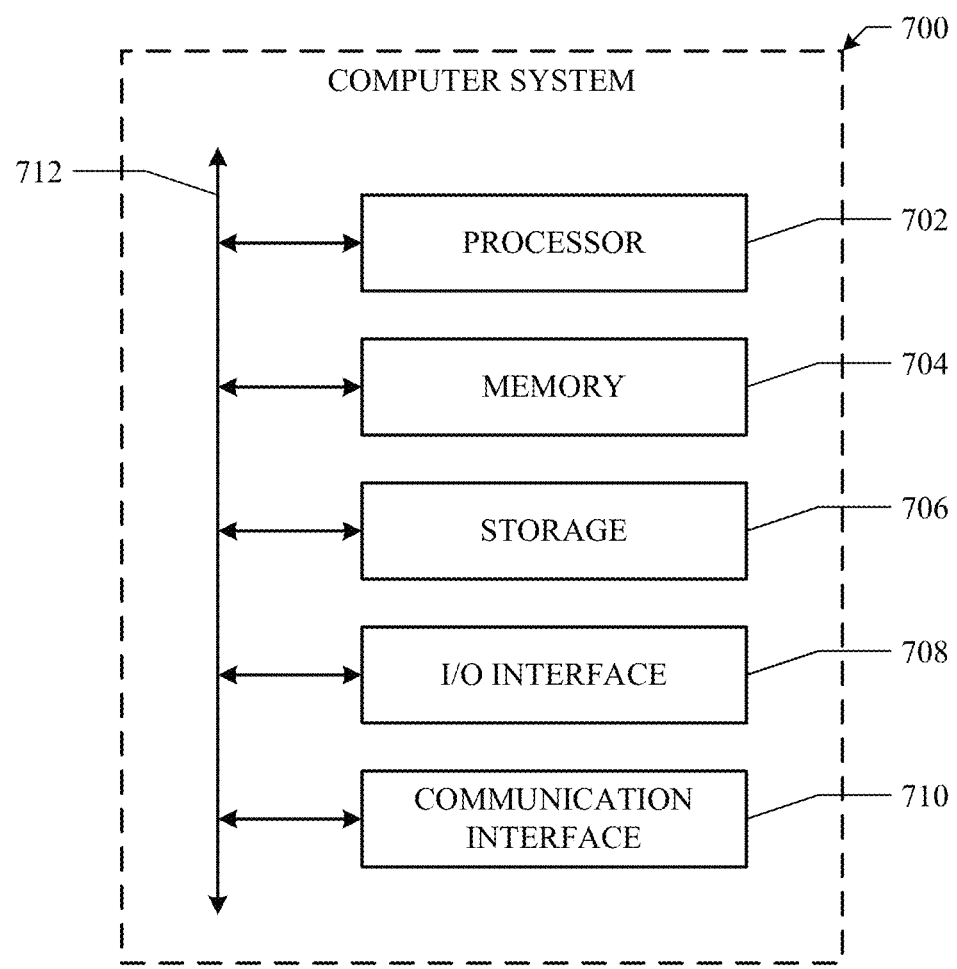
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. For example, client system 130, wireless access point 142, social-networking system 160, or third-party system 170 may include one or more portions of a computer system 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Figure 8:
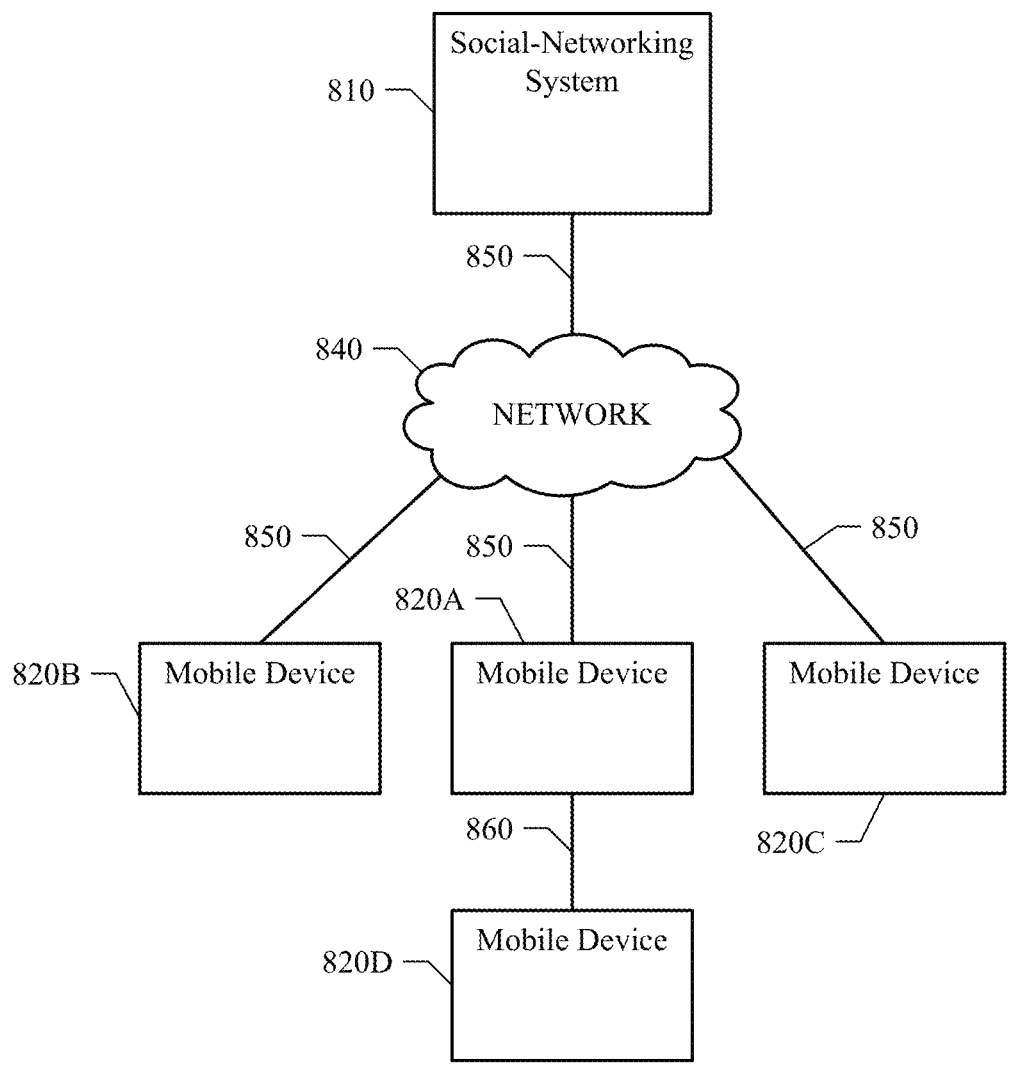
FIG. 8 illustrates an example system for providing a social hotspot.

FIG. 8 illustrates an example system 800 whereby mobile devices 820A, 820B, 820C interact with the social-networking system 810 through a network 840. In particular embodiments, links 850 illustrate interactions between mobile devices 820A, 820B, 820C and social-networking system 810. In particular embodiments, other links 850 illustrate interactions between mobile device 820D and mobile device 820A.

Mobile devices 820A, 820B, 820C, 820D are generally a computer or computing device including functionality for communicating over a computer network (e.g., remotely). Mobile devices 820A, 820B, 820C, 820D may be laptop or desktop computers, personal digital assistants (PDAs), in- or out-of-car navigation systems, smartphone or other cellular or mobile phones or mobile gaming devices, standalone mobile hotspots, MiFi devices, or personal travel routers, among other suitable mobile or non-mobile computing devices. Mobile devices 820A, 820B, 820C, 820D may execute one or more client applications, such as a web browser (e.g., Microsoft Windows Internet Explorer, Mozilla Firefox, Apple Safari, Google Chrome, and Opera, etc.), to access and view content over a network.

Mobile devices 820A, 820B, 820C, 820D may all be in proximity to each other and each have radio equipment that enables them to communicate to each other through other links 860. Particular embodiments may utilize a variety of underlying or enabling network technologies and protocols, including but not limited to, IEEE 802.11, IEEE 802.16, Ethernet, Address Resolution Protocol (ARP), Reverse Address Resolution Protocol (RARP), International Telecommunication Union Telecommunication Standardization Sector (ITU-T) G.hn, High-Level Data Link Control (HDLC), Bluetooth, and the like. Note that only four mobile devices are illustrated in order to simplify the discussion. In practice, there may be tens, hundreds, or even thousands of mobile devices in proximity to each that may attempt to access the network through a first mobile device. Mobile devices 820A, 820B, 820C, 820D may be so-called dual-mode phones, as described later.

In particular embodiments, one or more links 850 and other links 860 each includes one or more wireline, wireless, or optical links. In particular embodiments, one or more links 850 and other links 860 each includes an intranet, an extranet, a VPN, a LAN, a WLAN, a WAN, a MAN, a portion of the Internet, or another link 850 or a combination of two or more such links 850 or other links 860. The present disclosure contemplates any suitable links 850 coupling mobile devices 820A, 820B, 820C and social-networking system 810 to network 840. The present disclosure contemplates any suitable other links 860 coupling mobile device 820D to mobile device 820A.

Network 840 generally represents a network or collection of networks (such as the Internet or a corporate intranet, or a combination of both, or an ad hoc network) over which mobile devices 820 may access the social-networking system 810.

Social-networking system 810 may include any of the characteristics described above in connection with social-networking system 110. In particular embodiments of a social-networking system 810, an authentication server may authenticate mobile devices and users of the social-networking system prior to allowing social hotspot access through a mobile device. Particular embodiments of the authentication server may authenticate a user of mobile devices 820A, 820B, 820C and the mobile devices themselves. Particular embodiments may allow a user to login to the social networking system 810 through a third party website, at which time the authentication server may authenticate a user attempting to login to the social-networking system through the third party website.

Mobile devices may include so-called dual mode functionality including radio frequency (RF) and associated functionality allowing for wireless communication using different network protocols and networks. For example, some dual mode mobile devices allow for packet-based, wireless communications over a cellular network using cellular network protocols, and over wireless local area networks using so-called WiFi or IEEE 802.11 standards. The IEEE 802.11 standard supports both an infrastructure mode where wireless communications are coordinated by an access point and an ad hoc mode where wireless communications are coordinated by a designated peer node. Much of the IEEE 802.11 standard defines a common operation whether using ad hoc or infrastructure mode. The use of ad hoc mode only affects the protocols, so there is generally no impact on the Physical Layers (i.e., 802.11a and 802.11b). Within the Media Access Control (MAC) Layer, all of the carrier sensing and most of the frame types and corresponding usage are the same regardless of which mode is utilized. The absence of an access point, however, means that an ad hoc wireless LAN must take on more of the MAC Layer responsibilities.

Within the semantics of the open systems interconnection (OSI) network architecture, the Data Link Layer protocols respond to service request from the network layer and they perform their function by issuing service requests to the PHY Layer. In some networks, such as IEEE 802 local area networks, the Data Link Layer is described in more detail with MAC and Logical Link Control (LLC) sublayers. In general, the MAC Layer manages and maintains communications between 802.11 stations (radio cards and access points) by coordinating access to a shared radio channel and utilizing protocols that enhance communications over a wireless medium. Often viewed as the "brains" of the network, the 802.11 MAC Layer uses an 802.11 PHY Layer, such as 802.11b or 802.11a, to perform the tasks of carrier sensing, transmission, and receiving of 802.11 frames.

A Media Access Control address (MAC address) is a unique identifier assigned to network interfaces for communications on the physical network segment. MAC addresses are used for numerous network technologies and most IEEE 802 network technologies, including Ethernet and WLAN. MAC addresses are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. MAC addresses are formed according to the rules of one of three numbering name spaces managed by the Institute of Electrical and Electronics Engineers (IEEE): MAC-48, Extended unique identifier (EUI)-48, and EUI-64.

With respect to infrastructure wireless LANs, primary 802.11 MAC functions consist of scanning, authentication, association, wireless encryption protocol (WEP), request-to-send and clear-to-send (RTS/CTS), power save mode, fragmentation, and the like. The 802.11 standard defines various frame types that stations (i.e., NICs and access points) use for communications, as well as managing and controlling the wireless link, such as management frames, control frames, and data frames. Every frame has a control field that depicts the 802.11 protocol version, frame type, and various indicators, such as whether WEP is on, power management is active, and so on. In addition, all frames contain MAC addresses of the source and destination station (and access point), a frame sequence number, frame body and frame check sequence (for error detection).

IEEE 802.11 frames carry protocols and data from higher layers within the frame body. A data frame, for example, could be carrying the HTML code from a web page (complete with TCP/IP headers) that the user is viewing or code associated with a social-networking system. Other frames that mobile devices use for management and control carry specific information regarding the wireless link in the frame body. With respect to an infrastructure based network, for example, a beacon's frame body contains the service set identifier (SSID), timestamp, and other pertinent information regarding the access point.

IEEE 802.11 management frames enable stations, such as mobile devices, to establish and maintain communications. Common 802.11 management frame subtypes consist of authentication frames, deauthentication frames, association request frames, association response frames, reassociation request frames, reassociation response frames, disassociation frames, beacon frames, probe request frames, and probe response frames. 802.11 control frames assist in the delivery of data frames between stations. The following are common 802.11 control frame subtypes: Request to Send (RTS) frame, Clear to Send (CTS) frame, and Acknowledgement (ACK) frame. Further, 802.11 defines a data frame type that carries packets from higher layers, such as web pages, printer control data, and the like, within the body of the frame.

Figure 9:
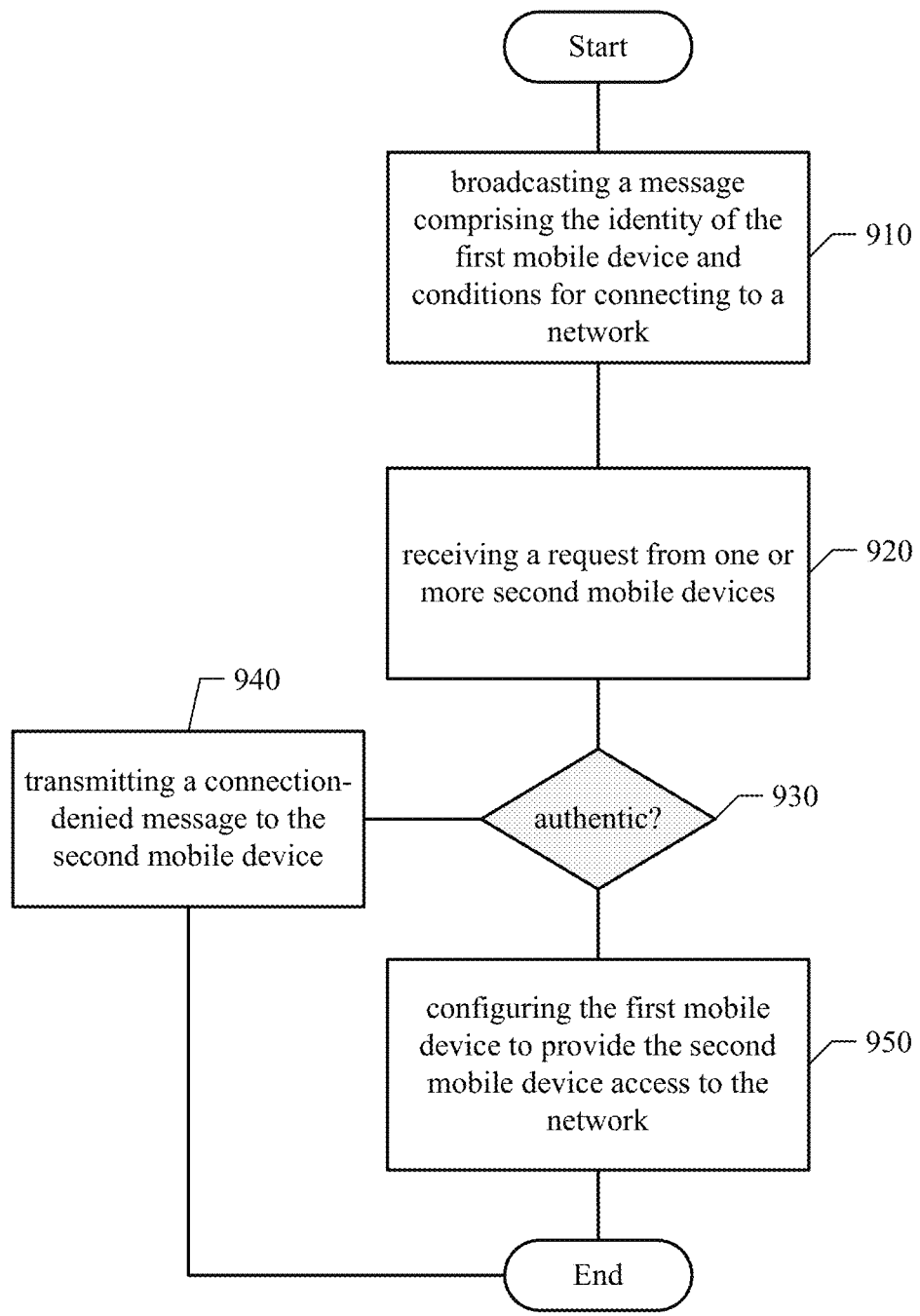
FIG. 9 illustrates an example method of neighbor discovery.

FIG. 9 illustrates an example method of establishing and utilizing a social hotpot. The method may start at step 910, where a first mobile device may broadcast a message having the identity of the first mobile device and conditions for connecting to a network through the first mobile device. At step 940 or 950, respectively, either the second mobile device may receive an access denied if the user of the second mobile device cannot be authenticated by the first mobile device, or in response to a second mobile device being authenticated, particular embodiments configure the first mobile device to provide network access to the second mobile device, at which point the method may end. Particular embodiments may repeat the steps of the method of FIG. 9, where appropriate. Moreover, although this disclosure describes and illustrates particular steps of the method of FIG. 9 as occurring in a particular order, this disclosure contemplates any suitable steps of the method of FIG. 9 occurring in any suitable order. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Particular embodiments of a social hotspot may be an application on a mobile device or as a part of a social-networking system application on the mobile device. Particular embodiments may provide a social hotspot that covers a public area with wireless signal. In particular embodiments, the social hotspot functionality is enabled on a mobile device and requires setup. Wireless access point functionality may be enabled. A name for the social hotspot, or the service set identifier (SSID), may be given a unique social hotspot name. The SSID may be a sequence of 2-32 octets each of which may take any value. This may be done either manually or automatically, based on a user's configuration of the social hotspot. In particular embodiments, the basic service set (BSS) comprises a single access point, or social hotspot, and all associated stations (STAs), or other mobile devices. The first mobile device acts as a master to control the other mobile devices within the BSS. The BSS identifier (BSSID) uniquely identifies the BSS, which may be the media access control (MAC) address of the mobile device.

In particular embodiments, the first mobile device may broadcast on a particular channel. In particular embodiments, for example, the user may select a channel on which to broadcast. For example, 802.11 uses radio frequencies in the range of 2412-2484 MHz and splits the available frequencies into 14 network channels, whereas Bluetooth uses short wavelength radio transmissions in the Industrial, Scientific, Medical (ISM) band from 2400-2480 MHz. The broadcasts, in 802.11 for example, may utilize a security algorithm, such as wired equivalent privacy (WEP), Wi-Fi protected access (WPA), or other security algorithm to encrypt the broadcast messages.

Particular embodiments may broadcast, from a first mobile device, a message having the identity of the first mobile device and conditions for connecting to a network through the first mobile device, as illustrated in step 910. In particular embodiments, the mobile device may periodically broadcast to other mobile devices in the vicinity that the first mobile device may be accessed as a social hotspot. The mobile device may be set to broadcast the SSID or to turn SSID broadcast off. The broadcast message may include the identity of a user of the first device, the identity of the first mobile device itself, and conditions for connecting to a network through the first mobile device.

In particular embodiments, the mobile devices 820A, 820B, 820C may append information elements, such as a user identifier, to the broadcast message. A user identifier may comprise a userID or other information (e.g., a uniform resource locator, etc.) associated with a user account for a user of a social-networking system. In particular embodiments, the userID and other information associated with the social-networking system may be encrypted. In particular embodiments, the social network information may be encrypted using asymmetric encryption (e.g., Public-Private key encryption). In particular embodiments, for example, each mobile device 820A, 820B, 820C, 820D may obtain an encrypted version of the user identifier corresponding to the respective user, where the encrypted version was encrypted by the social-networking system using a private key of the social-networking system. In this manner, only other users of the social-networking system (who obtain the public key) may decrypt the user identifying information and utilize the user identifier. In particular embodiments, the user identifying information may be encrypted using a symmetric key algorithm, where the encryption key is a function of the user identifier of the user. A mobile device that receives encrypted user identifying information would apply a key generation function to generate keys for all users in a locally stored list, such as a list of user identifiers in a local contacts database. If the decrypted user identifying information matches a user identifier stored in the local contacts database, a match is declared. In this manner, only social contacts of a given user may resolve the user identifying information with relative ease, as opposed to trying all possible combinations of user identifiers to decrypt the information.

Conditions for connecting may be login requirements, security requirements, restrictions on content access once networking access has been provided, and charges associated with the first mobile device providing the connection. The charges may be collected by the user of the first mobile device, the social-networking system, or a wireless carrier of the first mobile device, or other entity participating in the social hotspot environment. In particular embodiments, extending these messages allows mobile device 820A to associate an IP and/or MAC addresses of the mobile devices 820D with respective user identifiers.

In particular embodiments, the first mobile device may receive a request from one or more second mobile devices, as illustrated in step 930. If the second mobile device is within range of the first mobile device, it can select the first mobile device through which it may access the network. In particular embodiments, a social hotspot may present a captive portal to the second mobile device, the social hotspot may act as a social proxy server, or the social hotspot may comprise a non-mobile device and allow network access to mobile devices without presenting a captive portal or acting as a social proxy server.

In particular embodiments, the social hotspot may present a captive portal to the second mobile device that is attempting to access the network through the first mobile device. A captive portal forces an HTTP client on a network to see a special web page (usually for authentication purposes) before allowing the HTTP client to access the network normally. A captive portal turns a web browser on the first mobile device into an authentication device. This is done by intercepting all packets regardless of address or port, until the user opens a browser and tries to access the internet. At that time, the browser is redirected to a web page (e.g., network access page 300) that may require authentication and payment, or simply display an acceptable use police and require the user to agree. Captive portals are used at most Wi-Fi hotspots and it can be used to control social hotpot or wired access as well. In particular embodiments, a captive portal may use RADIUS or DIAMETER, or a HTTP protocol for access provisioning and accounting.

In particular embodiments, the portal, or social hotspot identifies clients by their IP and MAC addresses and requires that the user's web browser have an authenticator, that is, an encrypted message generated by the authentication server and that periodically has to be renewed and set to the gateway. In particular embodiments, the authenticator may be encrypted using standard encryption algorithms and cannot easily be counterfeited before it expires.

There are a variety of ways to implement a captive portal, such as by redirection by HTTP, an IP redirect, or redirection by Domain Name System (DNS). In redirection by HTTP, if an unauthenticated client requests a website, DNS is queried by the browser and the appropriate IP resolved as usual. The browser then sends an HTTP request to that IP address. This request, however, is intercepted by a firewall and forward to a redirect server. This redirect server responds with a regular HTTP response that contains HTTP status code 302 to redirect the client to the captive portal. To the client, this process is totally transparent. The client assumes that the website actually responded to the initial request and sent the redirect. In an IP redirect, client traffic may also be redirected using IP redirect on the layer 3 level. This has the disadvantage that content served to the client does not match the URL. In redirection by DNS, when a client requests a website, DNS is queried by the browser. The firewall will make sure that only the DNS server(s) provided by DHCP may be used by unauthenticated clients (or alternatively, it will forward all DNS requests by unauthenticated clients to that DNS server). The DNS server will return the IP address of the captive portal page as a result of all DNS lookups.

Figure 10:
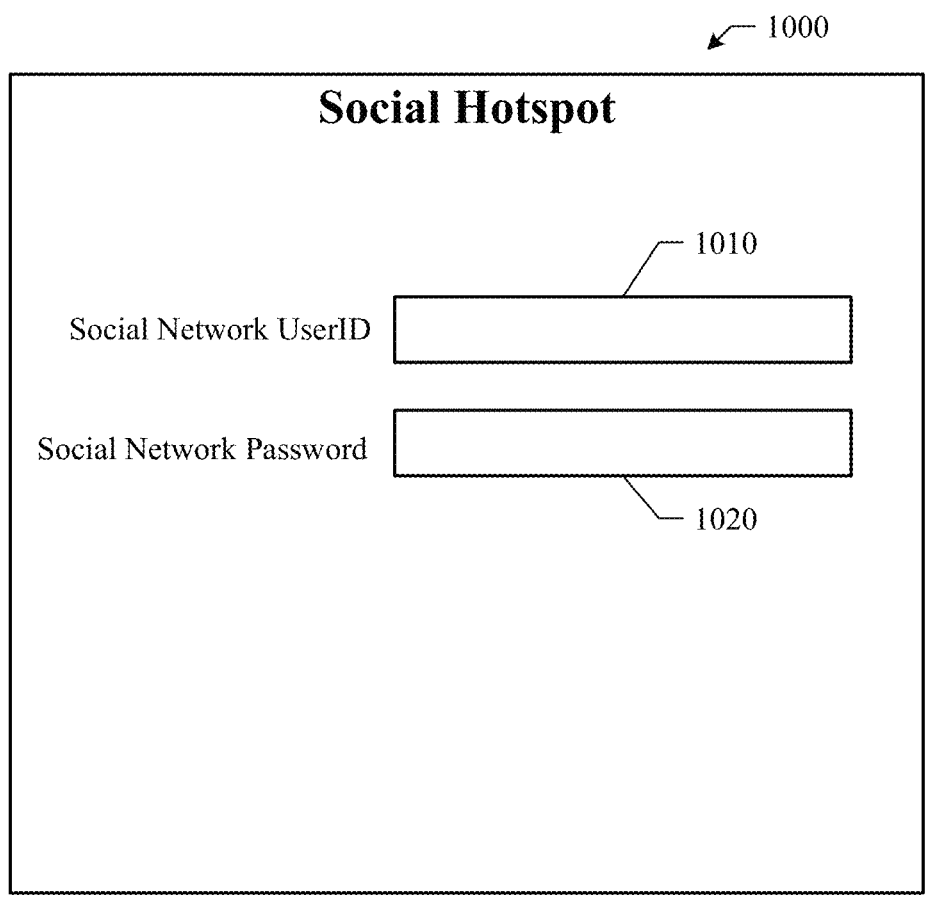
FIG. 10 illustrates an example login display.

FIG. 10 illustrates an example login page 1000 that may be displayed when a user of a second mobile device attempts to access the network through the first mobile device. Particular embodiments require users to pass an SSL encrypted login page, after which their IP and MAC address are allowed to pass through the gateway. Captive portals may require the use of a browser, which is usually the first application that a user starts, but users that first use an email client or other application will find the connection not working without explanation and will need to open a browser to validate. In particular embodiments, any non-web-traffic, such as SMTP for email, or FTP, may be blocked using a firewall of some type, but may be caught and redirected by a particularly sophisticated captive portal as well. In particular embodiments, the login page itself must be presented to the second mobile device. The login page may be either stored locally in the first mobile device or in the social-networking system 1010. In particular embodiments, the first mobile device may locally store UserIDs of friends of the first user in the social-networking system. In particular embodiments, the first mobile device may locally store UserIDs of users of the social-networking system that have liked a page associated with the first mobile device or a user of the first mobile device. The first mobile device may also locally store the UserIDs for second users of second mobile devices that have previously logged into the network through the first mobile device.

In particular embodiments, the social hotspot may act as a social proxy server. A proxy server is a server (computer system or application) that acts as an intermediary for requests from clients seeking resources from other servers. A client may connect to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy server may optionally alter the mobile device's request or the server's response, and sometimes it may serve the request without contacting the specified server. In this case, it "caches" responses from the remote server, and returns subsequent requests for the same content directly. Most proxies are a web proxy, allowing access to content on the internet. An intercepting proxy, also known as a forced proxy or transparent proxy, is a proxy that intercepts normal communication, without clients needing any special configuration to use the proxy. Clients do not need to be aware of the existence of the proxy. A transparent proxy is a proxy that does not modify the request or response beyond what is required for proxy authentication and identification. A non-transparent proxy is a proxy that modifies the request or response in order to provide some added service to the user agent, such as group annotation services, media type transformation, protocol reduction, or anonymity filtering.

In particular embodiments, the social hotspot may reside on a non-mobile device 820A and allow user of second mobile devices 820B, 820C, 820D to access the network without providing a captive portal or acting as a social proxy server. In particular embodiments, userIDs of users of mobile devices 820B, 820C, and 820D that have liked or checked into a particular location associated with the social hotspot within the social-networking system may be locally stored at the first non-mobile device 820A. In particular embodiments, for example, a social hotspot, such as a coffee shop, may allow users of mobile devices to access the network if they like the coffee shop or check-in at the coffee shop within the social-networking system. In this manner, users of second mobile devices 820B, 820C, and 820D may choose to like or check-in at the coffee shop in order to gain network access.

Particular embodiments may authenticate one or more second mobile devices with the social networking system, as illustrated in step 930. Particular embodiments of the social hotspot may authorize, authenticate, and retain an accounting of second mobile devices that access the network through the first mobile device. Authorization refers to the process where an entity's identity is authenticated, typically by providing evidence that it holds a specific digital identity such as an identifier and the corresponding credentials. Examples of types of credentials include, but are not limited to, passwords, one-time tokens, digital certificates, and phone numbers. Authorization determines whether a particular entity is authorized to perform a given activity, typically inherited from authentication when logging on to an application or service. Authorization may be determined based on a range of restrictions, for example, time of day restrictions, or physical location restrictions, or restrictions against multiple access by the same entity or user. Examples of types of service include, but are not limited to, IP address filtering, address assignment, route assignment, quality of services/differential services, bandwidth control/traffic management, compulsory tunneling to a specific endpoint, and encryption.

In particular embodiments, the social-networking system may authenticate mobile device 820A and mobile device 820D. In particular embodiments, authorization or authentication may be performed on the back-end by one or more servers or databases associated with the social-networking system. Users of the second mobile devices may be required to enter a user name in field 1010 and a password in field 1020, as illustrated in FIG. 10. In particular embodiments, the social-networking system may be utilized to authenticate mobile devices 820D with the social-networking system and as to mobile device 820A. This ensures that the user of mobile device 820D is who they say they are. It also may allow either mobile device 820A to access user information for the user of mobile device 820D and vice versa.

In particular embodiments, authorization or authentication may be performed at the first mobile device 820A or first non-mobile device 820A. Users of the first mobile and non-mobile device and second mobile devices may be required to login to the social-networking system in order to authenticate each user's identity. Authorization or authentication may be performed by the first mobile or non-mobile device 820A by comparing the UserID of the user of the second mobile device 820D with UserIDs locally stored at the first mobile device. In this manner, authorization and authentication may be simplified if a second user of a second mobile device 820D is a friend of the user of the first mobile device 820A, has previously connected to the network through the first mobile device 820A, or has liked a page associated with the first mobile device 820A. In particular embodiments, authorization or authentication may be performed in this manner at the first mobile or non-mobile device 820A without the use of a captive portal or proxy server.

In particular embodiments, the second mobile device may receive an access denied message if the user of the second mobile device cannot be authenticated by the first mobile device or the social-networking system, as illustrated in step 940. In response to a second mobile device being authenticated, particular embodiments configure the first mobile device to provide network access to the second mobile device, as illustrated in step 950. In particular embodiments, once the user of the second mobile device signs in and pays up, the social hotspot stops interfering with its traffic and reverts to a "pass-through" mode on the first mobile device. In particular embodiments, after authentication, a pop-up window may appear to the user to guarantee the renewing of the authenticator and to allow him to force a disconnection request by clicking a button or other clickable object. In particular embodiments, where the second mobile device attempts to connect to the network through the first mobile device the social hotspot may check the user's identity (usually by looking at the mobile device's relevant MAC address), and silently lets the mobile through if it is still within the time-window of service.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, at a wireless access point, from a client system of a first user, a request to access a network through the wireless access point, the wireless access point being operated by an entity;
   sending, by the wireless access point, an identifier comprising a unique code that uniquely identifies the client system to a social-networking system, the social-networking system comprising at least one social graph, the social graph comprising a plurality of nodes and a plurality of edges connecting the nodes, each of the edges between two of the nodes representing a relationship between the nodes, wherein a first node of the plurality of nodes corresponds to the first user;
   receiving, at the wireless access point, from the social-networking system, a positive authorization determination based on the identifier, wherein the positive authorization is determined because a timeline associated with the first user indicates that the first user has previously checked in with the entity; and
   providing the client system with access to the network through the wireless access point in accordance with the positive authorization determination.

2. The method of claim 1, wherein the identifier associated with the client system is a Media Access Control (MAC) address of the client system.

3. The method of claim 1, wherein the identifier associated with the client system is a user name of the first user profile.

4. The method of claim 1, wherein the request is a first request and the client system is a first client system, the method further comprising:
   receiving, at the wireless access point, from a second client system, a second request to access the network through the wireless access point, the second request including an identifier associated with the second client system; and
   providing the second client system with access to the network through the wireless access point in response to a determination that the first user profile includes the identifier associated with the second client system.

5. The method of claim 1, wherein the positive authorization determination is further based upon a relationship between the first user profile and a second user profile of the plurality of user profiles of the social-networking system, the second user profile associated with an operator of the wireless access point.

6. The method of claim 1, further comprising redirecting, by the wireless access point, the client system to a webpage of the entity, wherein the entity operates the wireless access point, the webpage hosted by the social-networking system.

7. The method of claim 3, further comprising sending to the client system an indication of one or more other user profiles of that have checked in with the entity, wherein the entity operates the wireless access point, and wherein each user profile is associated with a node in an online social graph.

8. The method of claim 1, further comprising:
   determining that the wireless access point has provided access to the network to one or more users with user profiles that have a relationship to the first user profile; and
   providing an indication of the one or more users to the client system.

9. A system comprising:
   one or more processors; and
   a memory coupled to the processors comprising instructions executable by the processors, the processors operable when executing the instructions to:
      receive a request from a client system of a first user to access a network through a wireless access point, the wireless access point being operated by an entity;
      send an identifier comprising a unique code that uniquely identifies the client system to a social-networking system, the social-networking system comprising at least one social graph, the social graph comprising a plurality of nodes and a plurality of edges connecting the nodes, each of the edges between two of the nodes representing a relationship between the nodes, wherein a first node of the plurality of nodes corresponds to the first user;

receive, from the social-networking system, a positive authorization determination based on the identifier, wherein the positive authorization is determined because a timeline associated with the first user indicates that the first user has previously checked in with the entity; and provide the client system with access to the network through the wireless access point in accordance with the positive authorization determination.

10. The system of claim 9, wherein the identifier associated with the client system is a Media Access Control (MAC) address of the client system.

11. The system of claim 9, wherein the identifier associated with the client system is a user name of a first user profile.

12. The system of claim 9, wherein the request is a first request and the client system is a first client system and wherein the processors are further operable when executing the instructions to:

receive, from a second client system, a second request to access the network through the wireless access point, the second request including an identifier associated with the second client system; and provide the second client system with access to the network through the wireless access point in response to a determination that a first user profile associated with the first user includes the identifier associated with the second client system.

13. The system of claim 9, wherein the processors are further operable when executing the instructions to redirect the client system to a webpage of the entity, wherein the entity operates the wireless access point, the webpage hosted by the social-networking system.

14. The system of claim 11, wherein the processors are further operable when executing the instructions to send to the client system an indication of one or more other user profiles that have checked into the entity, wherein the entity operates the wireless access point, and wherein each user profile is associated with a node in an online social graph.

15. One or more non-transitory computer readable media comprising logic operable to:

receive a request from a client system of a first user to access a network through a wireless access point, the wireless access point being operated by an entity;

send an identifier comprising a unique code that uniquely identifies the client system to a social-networking system, the social-networking system comprising at least one social graph, the social graph comprising a plurality of nodes and a plurality of edges connecting the nodes, each of the edges between two of the nodes representing a relationship between the nodes, wherein a first node of the plurality of nodes corresponds to the first user;

receive, from the social-networking system, a positive authorization determination based on the identifier, wherein the positive authorization is determined because a timeline associated with the first user indicates that the first user has previously checked in with the entity; and provide the client system with access to the network through the wireless access point in accordance with the positive authorization determination.

16. The media of claim 15, wherein the identifier associated with the client system is a Media Access Control (MAC) address of the client system.

17. The media of claim 15, wherein the identifier associated with the client system is a user name of the first user profile.

18. The media of claim 15, wherein the request is a first request and the client system is a first client system and the logic is further operable to:

receive, from a second client system, a second request to access the network through the wireless access point, the second request including an identifier associated with the second client system; and provide the second client system with access to the network through the wireless access point in response to a determination that a first user profile includes the identifier associated with the second client system, the first user profile being associated with the first user.

19. The media of claim 15, wherein the logic is further operable to redirect the client system to a webpage of the entity, wherein the entity operates the wireless access point, the webpage hosted by the social-networking system.

* * * * *